United States Patent [19]
Paris

[11] Patent Number: 5,213,172
[45] Date of Patent: May 25, 1993

[54] CLIMBING ROBOT, MOVABLE ALONG A TRESTLE STRUCTURE, PARTICULARLY OF A POLE FOR HIGH-VOLTAGE OVERHEAD ELECTRIC LINES

[76] Inventor: Luigi Paris, P.zza di Spagna, 81, 00161 Roma, Italy

[21] Appl. No.: 539,864

[22] Filed: Jun. 18, 1990

[51] Int. Cl.⁵ .......................... B66C 3/00; E04G 3/14
[52] U.S. Cl. ......................................... 180/8.1; 187/95
[58] Field of Search ...................... 180/8.1, 8.5, 8.6; 414/735, 750; 187/95

[56] References Cited

U.S. PATENT DOCUMENTS

| | | |
|---|---|---|
| 3,811,320 | 5/1974 | Cowell . |
| 4,637,494 | 1/1987 | Iida et al. .............................. 187/10 |
| 4,660,678 | 4/1987 | Krag ...................... 182/14 |
| 4,674,949 | 6/1987 | Kroczynski .......................... 414/750 |
| 4,738,583 | 4/1988 | Macconochie et al. ............. 414/735 |

FOREIGN PATENT DOCUMENTS

| | | | |
|---|---|---|---|
| 713752 | 2/1980 | U.S.S.R. ............................... | 180/8.1 |
| 713967 | 2/1980 | U.S.S.R. ............................... | 180/8.1 |

*Primary Examiner*—Mitchell J. Hill
*Attorney, Agent, or Firm*—Young & Thompson

[57] ABSTRACT

A robot is apt to climb along a trestle structure, particularly the trestle of a pole for high-voltage overhead electric lines, in order to carry work tools from the base to the top of the pole. The robot includes a main support body, at least one slide movable along the body, a first gripping hand carried by the body, a second gripping hand carried by the slide, arms for moving the gripping hands substantially perpendicular to the pole, each gripping hand being equipped with clamping fingers for gripping either an upright of the pole or a ledger of the trestle structure, and at least one position sensor associated with the body for acquiring position data concerning the configuration of either the pole or the trestle structure.

14 Claims, 9 Drawing Sheets

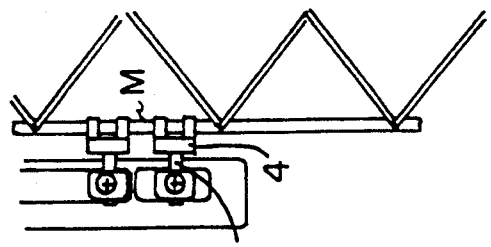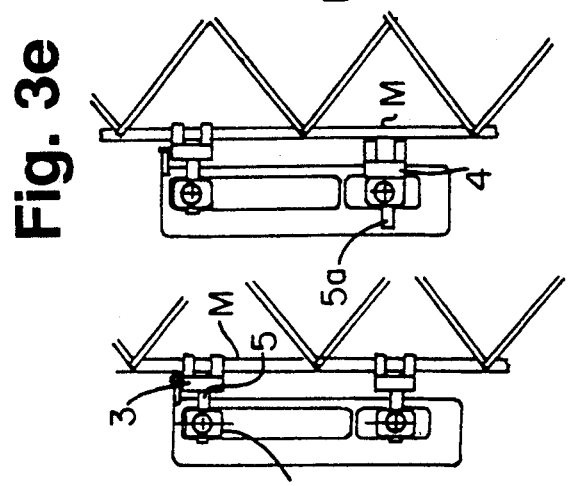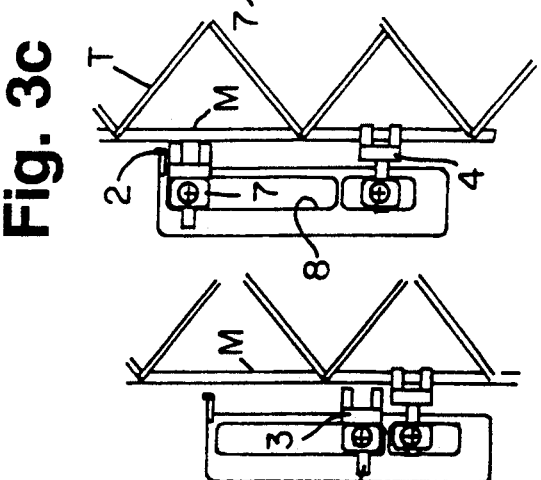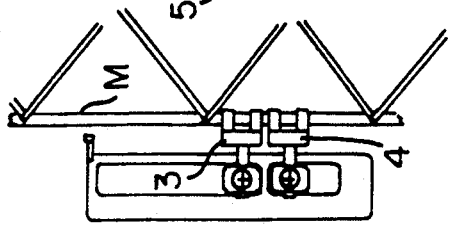

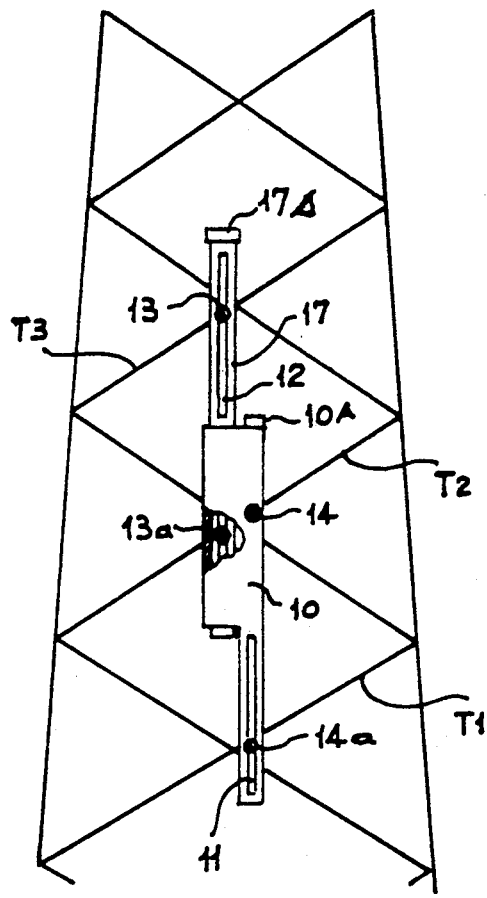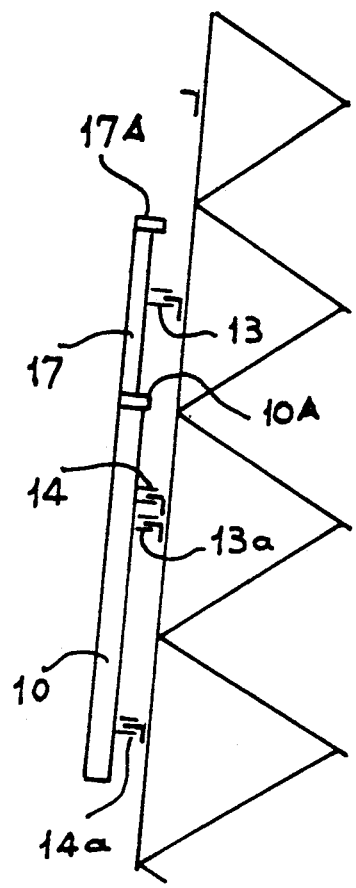
Fig. 6a                    Fig. 7a

CLIMBING ROBOT, MOVABLE ALONG A TRESTLE STRUCTURE, PARTICULARLY OF A POLE FOR HIGH-VOLTAGE OVERHEAD ELECTRIC LINES

BACKGROUND OF THE INVENTION

The invention concerns a robot apt to climb along a trestle structure, particularly the trestle of a pole for high-voltage overhead electric lines, in order to carry work-tools from the base to the top of the pole. More specifically, the robot according to the invention has been engineered to carry up to the pole brackets for instance equipment to wash the insulator chains, of the type described in EP-A1-0360012, filed by the same Applicant. For this reason, and also to make the description shorter, reference will be made hereinafter to the trestle structure of an electric line pole; it is however understood that the robot according to the invention can easily be used to perform different operations, on trestle structures other than those indicated hereabove, or on fixed or temporary trestlework or tubular scaffolding.

In present technology, no apparatus is known to go up and down under its own power, from the base of a pole to the top thereof, by climbing along the trestle structure. In fact, each time an operation has to be performed at the top of the pole, or on its brackets, the operator has to go up himself by climbing along the pole, or using suitable ladders.

The invention starts from the consideration that a trestle pole, or generally a trestle structure, has a plurality of angle bars of standard size, positioned so as to form:

four corner uprights, wherein the two flanges of the angle bar lie on the planes of two adjacent pole surfaces, and a plurality of oblique crossing ledgers, commonly called trestles, each having a flange on the plane of the pole surface; the other flange, perpendicular to the pole surface, respectively projects outwardly of the pole for a set of ledgers having the same inclination, and inwardly of the pole for the set of ledgers crossing with the first set.

SUMMARY OF THE INVENTION

The climbing robot according to the invention essentially comprises:
a main support body,
at least a main slide, movable along said body according to a main moving axis substantially vertical and parallel to the pole surface,
at least a first gripping hand carried by the support body and at least a second gripping hand carried by the slide, each gripping hand being equipped with clamping means to grip an angle bar of the trestle structure,
shifting means, to move said hands according to a transversal axis, substantially perpendicular to the pole surface,
at least one position sensor associated with the main body, to acquire position data concerning the configuration of the trestle, and
a processing system which controls the movements of said slide and of said gripping hands, also using and/or storing the signals sent from said sensors.

BRIEF DESCRIPTION OF THE DRAWINGS

Further characteristics and advantages of the robot according to the invention will anyhow be more evident from the following detailed description of some preferred embodiments thereof, given by way of example and illustrated on the accompanying drawings, in which:

FIGS. 3a to 3g show, on a reduced scale, a climbing sequence of the robot of FIG. 1;

FIGS. 6a and 7a are a front view and, respectively, a side view of an embodiment of the robot according to the invention, apt to climb on a trestle pole holding onto the ledgers;

FIGS. 8b to 8f show a working sequence of the gripping hand of FIG. 8a.

DESCRIPTION OF THE PREFERRED EMBODIMENTS

Figure 1:
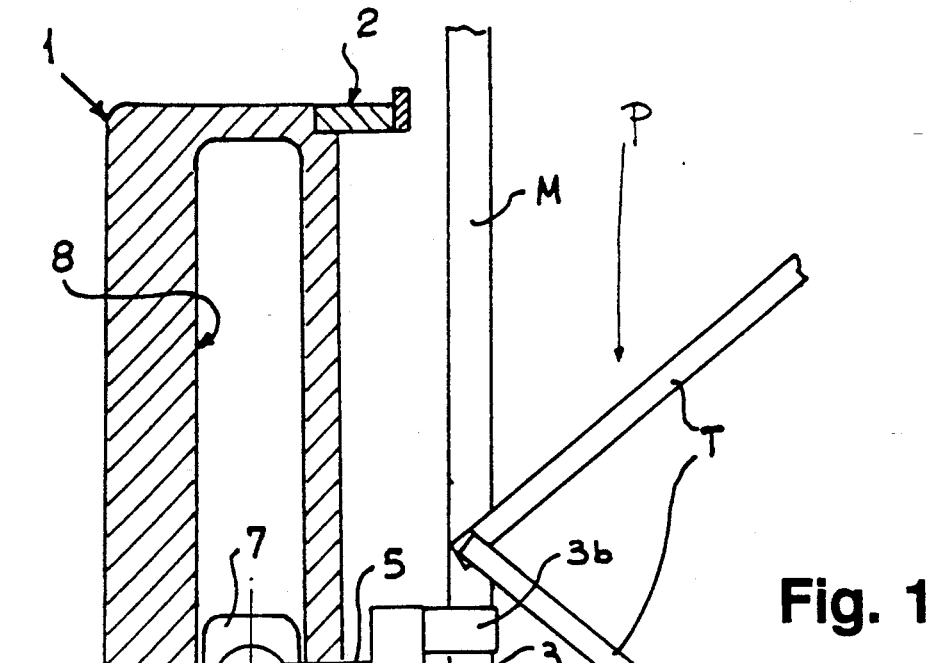
FIG. 1 is a diagrammatic front elevation, showing part of a pole trestle and a robot according to the invention climbing along one of the corner uprights of the pole.

As shown in FIG. 1 of the drawings, the body 1 of the climbing robot is positioned with its longitudinal axis substantially parallel to the upright M of the trestle pole, and is provided with a sensor 2 to scan the surface of the upright M, and with two gripping hands 3 and 4 to hold onto the upright M. The sensor 2 is apt to detect the areas of the uprights M—where there are no connections of the pole ledgers T and no upright joints—onto which can hold the gripping hands 3 and 4. Each hand 3, 4, is apt to support on its own the weight of the robot during its climbing along the pole P, while, during working of the equipment (not shown) carried by the robot, both gripping hands 3 and 4 hold onto the upright M.

Figure 2:
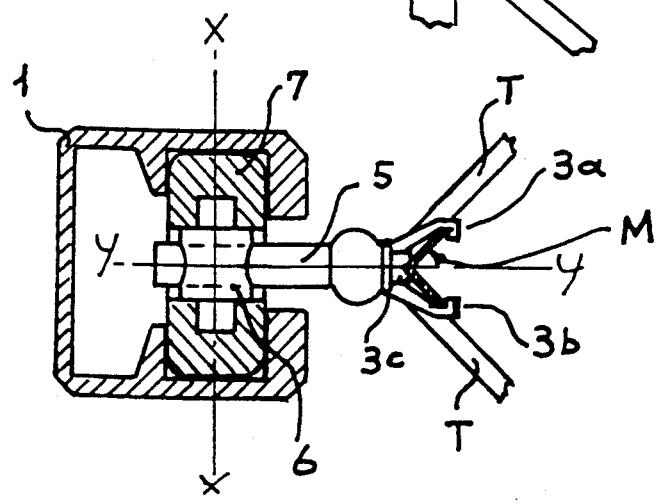
FIG. 2 is a diagrammatic plan view of the pole and of the robot of FIG. 1.
Figure 4A:
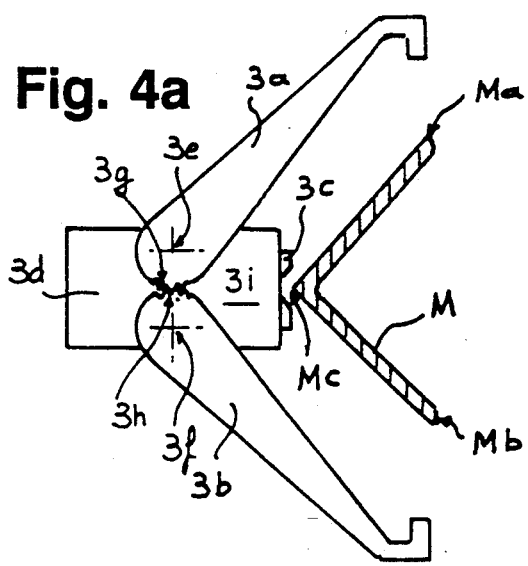
FIGS. 4a, 4b and 4c are diagrammatic plan views of a gripping hand of the robot shown in the previous figures.
Figure 4B:
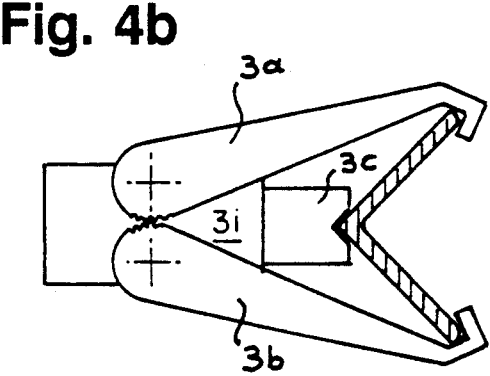
Figure 4C:
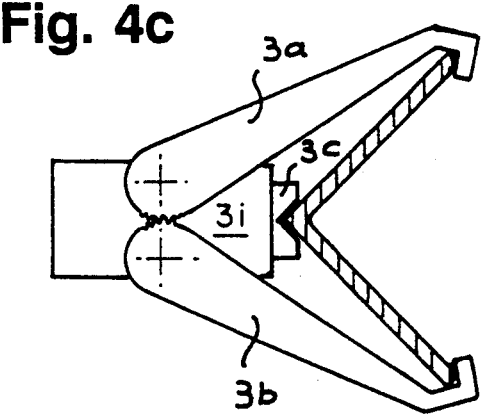

As clearly shown in FIGS. 1 and 2, and in further detail in FIGS. 4a to 4c, the gripping hand 3 comprises two pairs of clamping fingers 3a and 3b, essentially in the form of hooks, and a dihedral bearing seat 3c; onto the seat 3c, there bears the corner edge Mc (FIG. 4a) of the angle bar forming the upright M, while the hook ends of the clamping fingers 3a, 3b, hold onto the free edges Ma and Mb of its sides.

The clamping fingers 3a and 3b are carried by a support body 3d and are hinged about respective vertical axes 3e, 3f (FIGS. 4a), as well as being engaged in mutual rotation, thanks to respective reciprocally engaging toothings gear teeth 3g, 3h, provided at the hinged ends of the fingers 3a, 3b. The bearing seat 3c is carried by—or directly formed into—the head of a control piston 31, movable along the horizontal axis Y—Y of the gripping hand 3, for the function better described hereinafter.

Said gripping hand 3—like the hand 4 which is exactly alike—works as follows: when the gripping hand 3 approaches the upright M, its fingers 3a, 3b, are wide apart (FIG. 4a) and the hand 3 draws close up to carrying the dihedral seat 3c against the edge Mc of the upright M. At least one of the fingers 3a, 3b, is then caused to rotate so as to in turn move close to the upright M (FIG. 4b), the other finger performing a symmetrical approaching movement due to engagement of the gear teeth 3g, 3h. The piston 31 carrying the seat 3c is finally driven out, thereby pressing said seat 3c against the edge Mc and causing, by reaction, the backing of the whole hand 3 until the hooks of fingers 3a, 3b, hold onto the edges Ma, Mb. The stronger the action of said piston 31, the tighter the hold of said hooks and, respectively, of the seat 3c onto the upright M. See FIGS. 4b and 4c.

Figure 5:
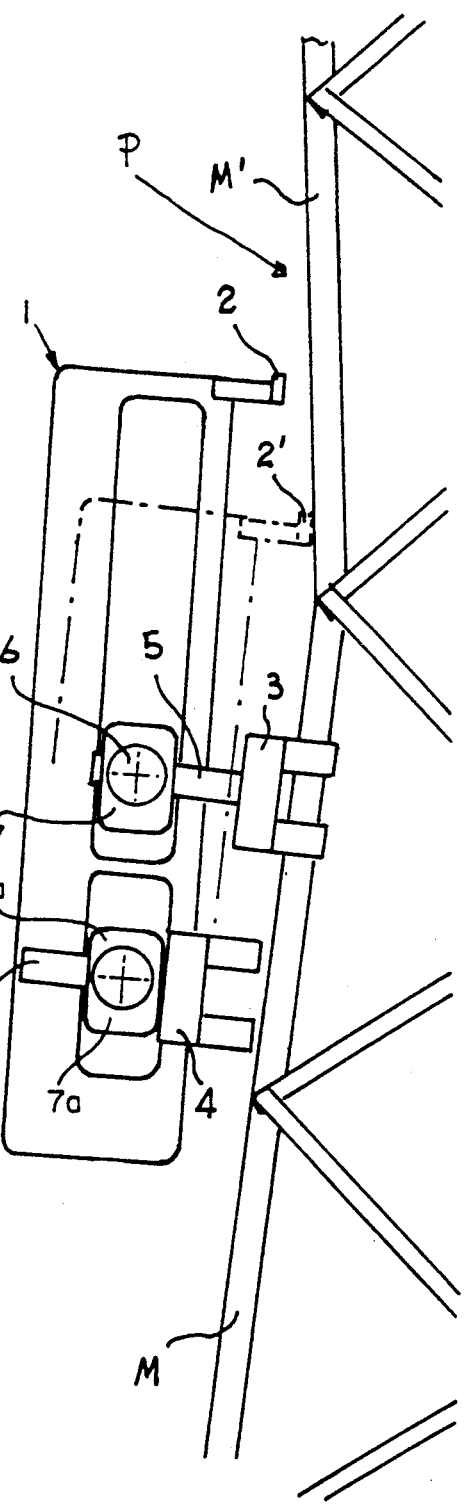
FIG. 5 shows the behaviour of the robot of FIG. 1, in correspondence of a point where the front surface of the trestle pole changes inclination.

As shown in FIG. 5, the gripping hand 3 is mounted on a respective support arm 5 of prismatic shape, for instance rectangular, which is slidably mounted into a corresponding seat of a support core 6, according to the transversal axis Y—Y substantially perpendicular to the pole surface. See FIG. 2. The core 6 is in turn mounted rotatable about the horizontal axis X—X, perpendicular to the axis of the arm 5, into a seat formed in the slide 7, which is slidable into a guide 8 (FIG. 1) formed in the body 1.

The axial movement of the arm 5 allows the gripping hand 3 to draw close to or away from the body 1.

The rotary motion of the core 6 allows the gripping hand 3 to rotate on a vertical plane corresponding to the plane of FIG. 1.

The motion of the slide 7 in the guide 8 allows a movement of the gripping hand 3 in a direction substantially parallel to the upright M.

The gripping hand 4 is fully identical to the hand 3—i.e. it is carried by an arm 5a, by a core 6a and by a slide 7a—except that the guide 8a for the slide 7a is shorter and thus allows, as shown in FIG. 1, a movement which is far more limited than that of the slide 7. In actual fact, as explained more in detail hereinafter, the movement of the slide 7a is not strictly necessary in the climbing step of the robot; it can instead be helpful to adjust the position of the main body 1 in the working step (not shown) of the equipment.

All these movements of the gripping hands 3, 4 and fingers, as well as of the slides 7, 7a, with respect of to the body 1, are controlled by motors (for instance, stepping or D.C. motors with numerical position control, not shown), operating under the control of a processing unit (also not shown) associated with the robot.

Said processing unit is preferably equipped with a memory, into which is stored the fundamental data—or even detailed information, according to cases—concerning the configuration of the trestle structure, so that the only function of the sensor 2 is to acquire position data on the pole structure. In other words, since pole trestle structures normally have standardized configurations, these configurations can be stored in a memory so that the robot is apt to move in an environment which is at least partly structured.

The working of the robot described heretofore—in its climbing step along the pole—is clearly illustrated in FIGS. 3a to 3g. FIG. 3a corresponds to FIG. 1 and shows the two gripping hands 3 and 4 holding onto the upright M.

In FIG. 3b, the fingers of the hand 3 release the upright M and the arm 5 moves backward to draw said hand 3 away from the upright M.

In FIG. 3c, the slide 7 moves from the bottom to the top end of the guide 8. During this movement, the sensor 2 scans the surface of the upright M and, as previously said, supplies the signal to stop the slide 7 in a position along said upright M where there are no obstacles, represented for example by the connections of the ledgers T or by the joints of the angle bars forming the upright M.

The positions—or, rather, the coordinates of the positions—along the trestle structure, where obstacles are detected by the sensor 2, as well as the positions in which the gripping hand 3 is authorized by the sensor 2 to hold onto said structure, are stored into the processing unit so as to be subsequently used again for positioning the other gripping hand 4 in the climbing up step or, viceversa, for positioning both hands 3 and 4 as the robot climbs down the pole.

In FIG. 3d, after stopping of the slide 7, the arm 5 moves forward again to lead the hand 3 into engagement with the upright M and be firmly gripped thereon.

In FIG. 3e, the fingers of the hand 4—which, in all the previous steps from 3a to 3d, were always tightly clamped onto the upright M—release the upright M, and the arm 5a moves backward freeing said hand 4 from the upright M itself.

In FIG. 3f, the slide 7 of the hand 3 moves down to the bottom end of the guide 8 and, due to the hand 3 being firmly gripped onto the upright M, the whole body 1 of the robot moves upward by reaction.

In FIG. 3g, the arm 5a moves forward again and the hand 4 holds once more onto the upright M. This position corresponds exactly to that of FIG. 3a, except that the robot engages onto a higher point of the pole upright M. From this position a new climbing cycle can start—as that described above—to shift the robot upward by another step.

From the above description, it clearly results that the slide 7a has performed no movements; this confirms what has already been stated, namely that the use of a second slide 7a is not strictly necessary, except that it provides the advantage of a more proper adjustment of the position of the body 1 with respect to the pole, in case of interference of the gripping hands 3, 4 with the positions of connection of the ledgers T onto the upright M, or with the upright joints.

To cause the robot to climb down the pole, it is sufficient to reverse the sequence of the above cycle steps; it does not seem necessary to describe herein this reversed sequence, as it is within easy reach of a technician skilled in the art. It should merely be remembered that this climb down is controlled by the processing unit thanks to the position data acquired and stored during the climbing up step,—as already said—or else by placing another position sensor (not shown in the drawings) in correspondence to the bottom end of the body 1 of the robot.

From the above description, it can be noted that the cores 6, 6a, have performed no rotary movements. In fact, so long as the upright M is straight, the cores 6, 6a, are not caused to rotate. Said rotation is however indispensable—as shown in FIG. 5—when the surface of the pole P changes inclination, to allow the robot to get over the variation point where the inclined upright M of the lower part of the pole meets with the vertical upright M' of the upper part of the pole.

When the body 1 moves upward—as described with reference to FIG. 3f—the sensor 2, which would be meeting the upright M' in the position 2' indicated in dashed lines in FIG. 5, controls the progressive rotation of the core 6 in respect of the slide 7, and—taking into account the fact that the arm 5 is locked onto said core and holds firmly onto the upright M—causes the rotation by reaction of said slide 7 and, with it, of the whole body 1 with respect of to the core 6.

At the same time, the arm 5 is caused to slide inside the core 6, so as to move the gripping hand 3 away from the body 1 of the robot. In this way, as the body 1 moves upward, it is progressively rotated and shifted so as to keep its upper end always at the same distance from the upright M'.

The body 1 can thus reach the position shown in full lines in FIG. 5, according to the new inclination of the upright M'. In this position, the arm 5a can be moved forward to cause the hand 4 to grip onto the upright M.

Once the hand 4 holds tightly onto the upright M, the hand 3 can be released and shifted upward—just as shown in FIGS. 3b an 3c,—and subsequently caused to grip onto the upright M'. A correct grip is here guaranteed by the fact that the core 6 is again rotated, so as to position the arm 5 perfectly perpendicular with respect of the upright M'.

Thus, the processing unit substantially produces a coordinate rotation of the cores 6, 6a—and thereby a shifting of the slides 7, 7a, and of the arms 5, 5a—so as to prevent any interference of the body 1 with the pole structure and, at the same time, keep the hands 3 and 4 always parallel and in a correct gripping position onto the pole upright.

The above description refers to a robot climbing up and down the "edges" of the pole, that is, along one of the corner uprights M of the trestle structure. In the embodiment of FIGS. 6 to 8, the robot is instead configured so as to climb along a "wall" of the pole, that is, on the ledgers T of the trestle structure.

As in the previously described embodiment, a slide 17 is slidably mounted on the body 10 of the robot and gripping hands are associated both with the body 10 and with the slide 17. In this case, however, instead of providing two pairs of fingers associated with each hand, use is made of two separate gripping hands 13, 13a, associated with the slide 17 and, respectively, of two gripping hands 14, 14a, associated with the body 1.

Preferably, at least one of the two hands of each pair is mounted on a slider movable lengthwise, that is, parallel to the motion direction of the slide 17; thanks to this assembly, the two hands of each pair are apt to move one with respect to the other, with the possibility to draw close or apart.

More exactly, the gripping hand 14a is mounted on a slider (better described hereinafter) slidable to a guide 11 of the body 10, while the gripping hand 13 is mounted on a slider sliding to a guide 12 of the slide 17. This arrangement allows both hands to grip onto a different ledger T, the ledgers normally being quite spaced apart and, furthermore, at varying mutual distances along the pole height.

A position sensor 17A is associated with the upper end of the slide 17, and is apt to detect and store the positions of the ledgers T and possibly also their inclination. Preferably, a second sensor 10A is associated with the upper end of the body 10.

As already said above, also in this case at least the general data and/or part of the position coordinates of the trestle configuration can be previously stored in the memory of the processing unit, starting from the data resulting from the pole project design.

As known and already said, in trestle structures of this type, the angle bars forming the ledgers T are positioned with a first flange on the plane of the pole surface and with a second flange perpendicular to said surface. Furthermore, to realize a proper crossing of the ledgers T, the second flange of a set of such ledgers T—all having a first equal inclination—projects outwardly of the pole, while the second flange of another set of such ledgers T—all having a second equal inclination—projects inwardly of the pole, so as to cross properly with the first set. As described more clearly hereinafter, with reference to the details of FIGS. 8a to 8f, the hands of this robot are apt to grip onto the horizontal flanges of the ledgers T projecting outwardly of the pole.

The working of this robot is quite similar to that of the previous embodiment: in FIGS. 6a and 7a, the robot holds with the lower hand 14a of the body 10 onto the ledger T1, with the upper hand 14 of the body 10 onto the ledger T2 with the lower hand 13a of the slide 17 also onto the ledger T2, and with the upper hand 13 of the slide 17 onto the ledger T3.

Figure 6B:
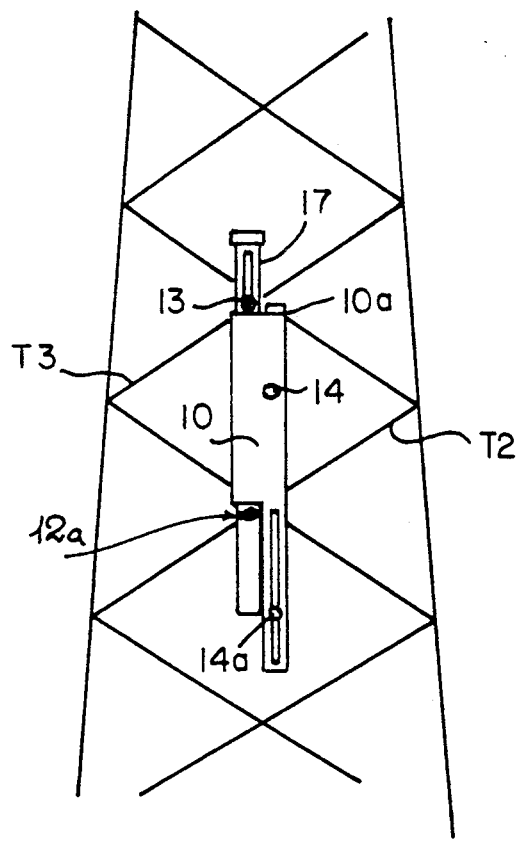
FIGS. 6b, 6c, 6d and, respectively, 7b, 7c, 7d, are views similar to those of FIGS. 6a and 7a, showing a climbing sequence of the robot according to this embodiment.
Figure 7B:
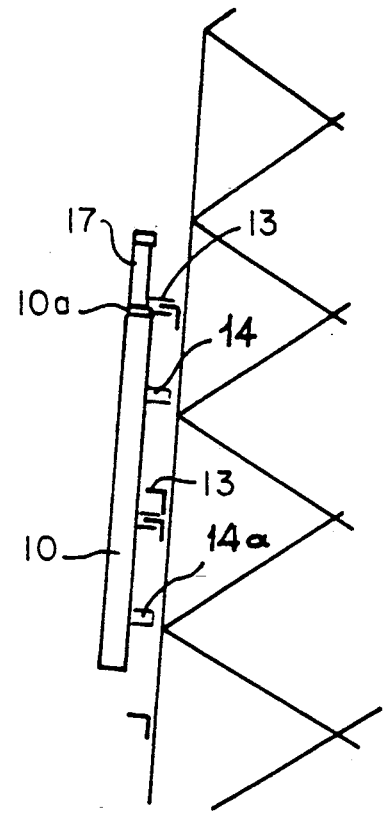

When the robot has to move up along the pole, the hands 14 and 14a are released and, while the hands 13 and 13a keep the slide 17 firmly anchored onto the ledgers T2 and T3, the body 10 is shifted along the slide 17 (FIGS. 6b and 7b).

Figure 6C:
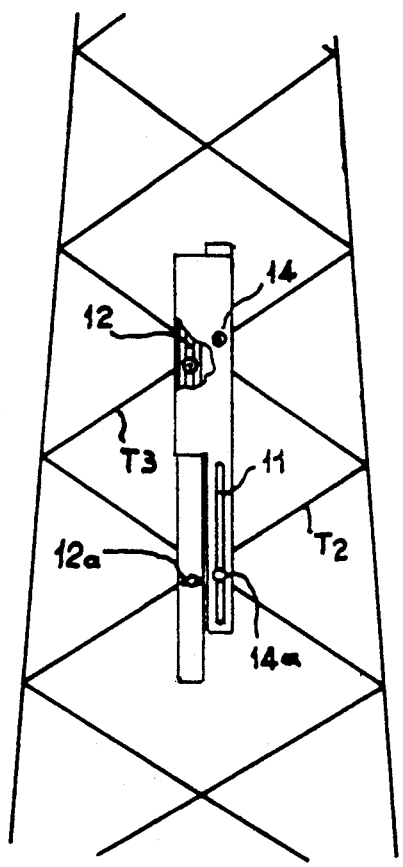
Figure 7C:
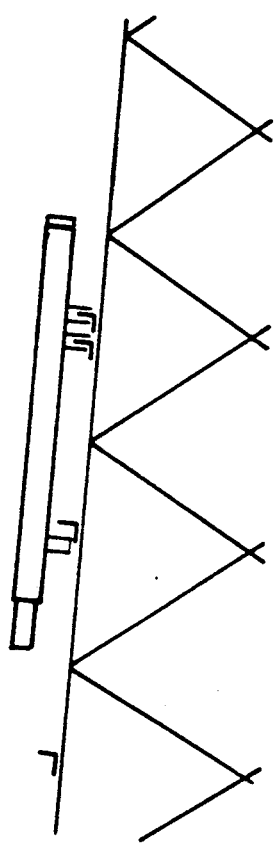

The body 10 slides upward until its sensor 10A—which detects the presence of the ledger T3—causes the upper hand 14 to stop in correspondence to said ledger T3 and hold onto the same (FIGS. 6c and 7c). The body 10 being thus anchored, the gripping hand 14a is caused to slide along the guide 11 up to stopping in correspondence of the ledger T2 and hold onto the same (FIGS. 6d and 7d).

Figure 6D:
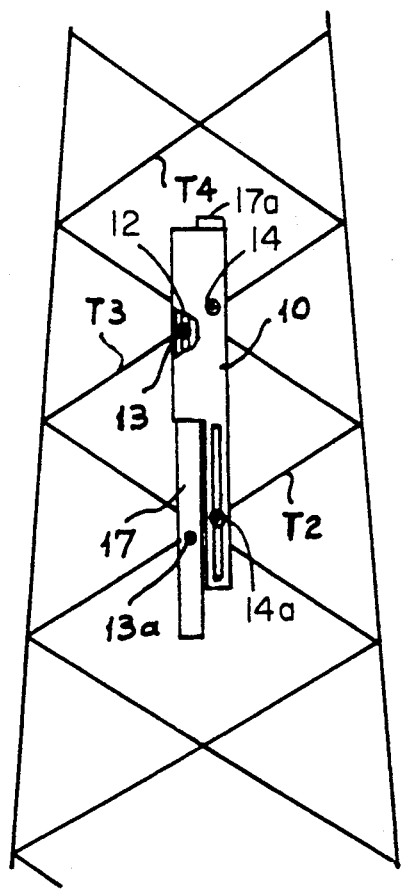
Figure 7D:
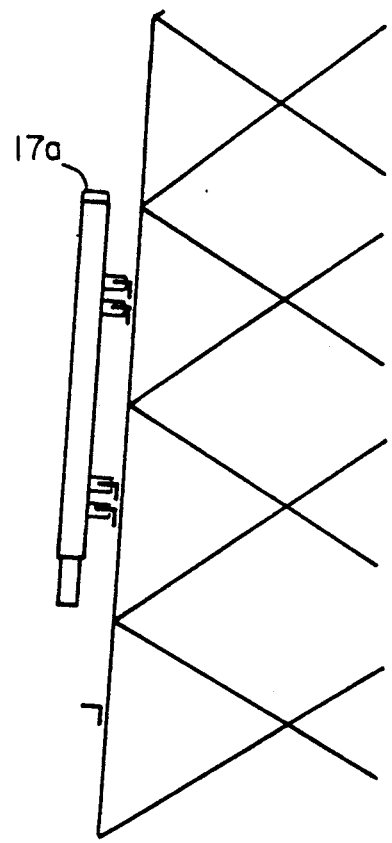

From the position shown in FIGS. 6d and 7d, where all the hands 13, 13a, 14, 14a, are firmly anchored onto the respective ledgers, the successive step (not shown) provides for: the release of hands 13, 13a; the upward shifting of the slide 17 until the sensor 17A detects the ledger T4; the gripping of the upper hand 13 onto the ledger T4; the further sliding of the hand 13 in respect of its guide 12 and, consequently, the simultaneous shifting, by reaction, of the slide 17, up to carrying the hand 13a in correspondence to the ledger T3, whereon it grips. This position corresponds to that shown in FIGS. 6a and 7a, except that the robot is now at a higher level along the pole.

Also in this case, when the operator wants the robot to climb down the pole, it is sufficient to reverse the sequence of operations of the previous cycle—in a manner within full reach of an expert in the art—using the information stored while the robot was climbing up the pole.

Preferably, the lower hand 13a of the slide 17 is movable into a short transversal guide 12a, substantially perpendicular to the guide 12 and shown very diagrammatically in FIG. 6c. This transversal movement is used just before operating the slide 17 (FIG. 6d), or also while the body 10 is moving upward (in any case, when the gripping hands of the body 10 are disengaged from the respective ledgers T), in order to control the perfect vertical alignment of the robot. The same operation can be performed when the robot climbs down the pole.

Figure 8A:
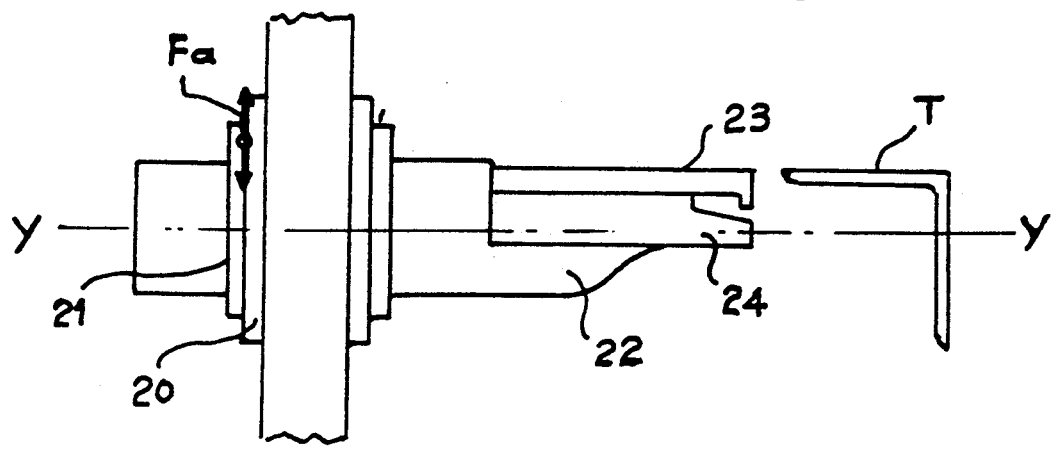
FIG. 8a shows the detail of a gripping hand of the robot according to the embodiment of FIGS. 6 and 7.

FIGS. 8a to 8f how, quite diagrammatically, a possible embodiment of a gripping hand to be used in a robot according to the embodiment of FIGS. 5 and 6. This hand comprises:

a slider 20 moving vertically, as already said, with respect to either the guide 11 of the body 10, or the guide 12 of the slide 17; (see FIG. 6a)

a ring 21, mounted on the slider 20 rotatable about the horizontal axis Y—Y (see FIG. 8a);

a body 22, slidable with respect to said ring 21 in the direction of said axis Y—Y; and a hook finger 23, slidable with respect to the body 22, also in the direction of the axis Y—Y, and apt to cooperate with a counterfinger 24.

Figure 8B:
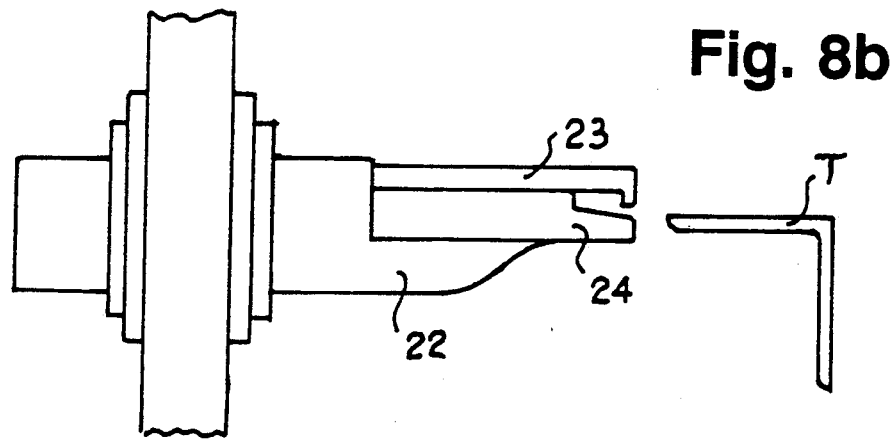
Figure 8C:
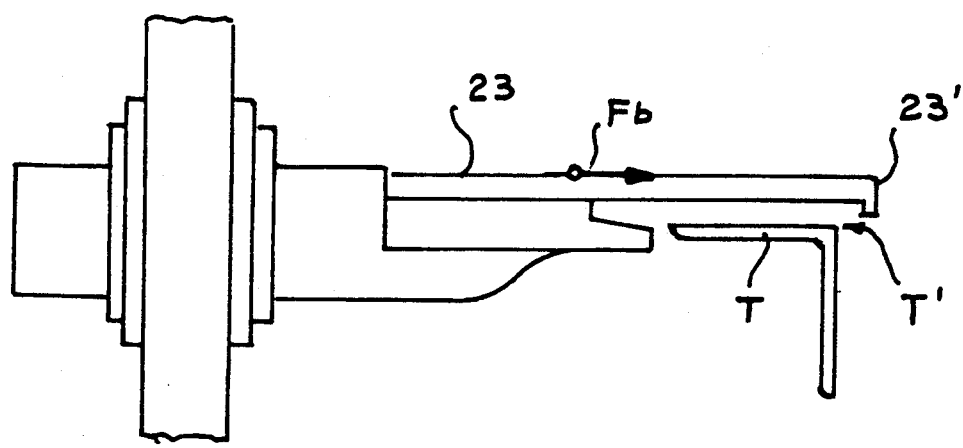
Figure 8D:
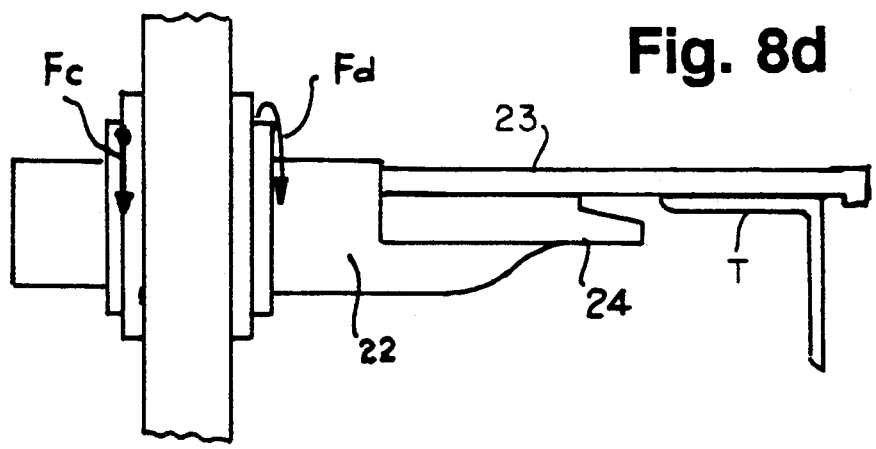
Figure 8E:
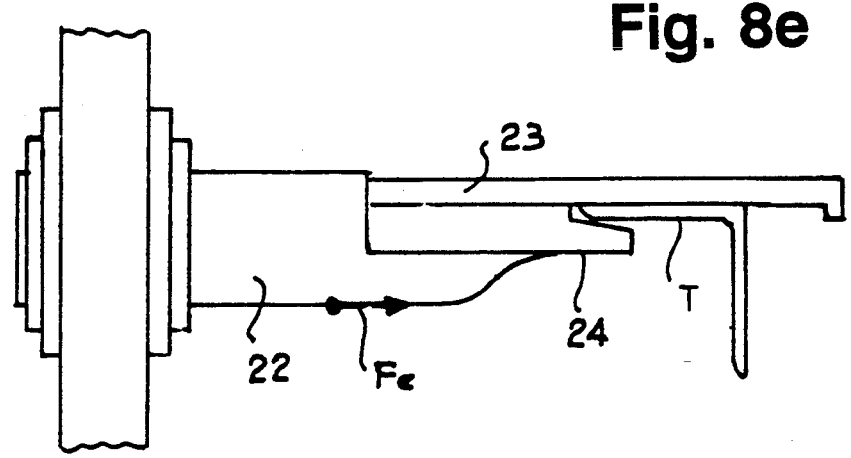
Figure 8F:
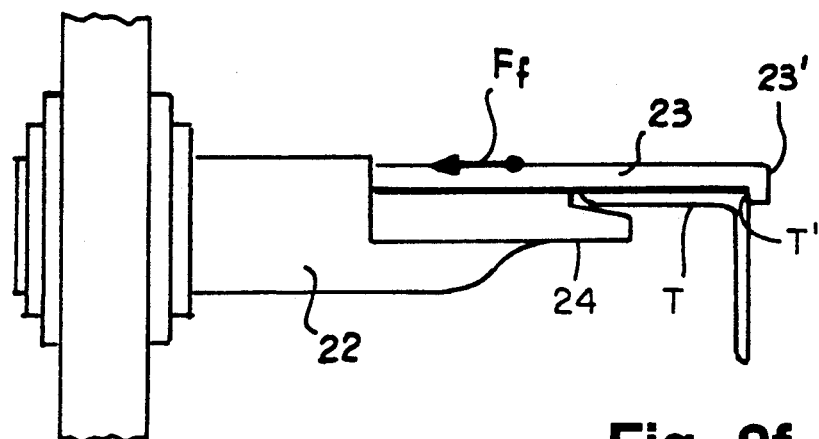

The working of the above gripping hand—taking into account the movements already described with reference to FIGS. 6 and 7—is as follows:

in FIG. 8a, the hand is moving up according to the arrow Fa. This movement can be that determined by the motion of the body 10 of the slide 17,(FIG.6a) or else that determined by the slider 20 to the guides 11 or 12 (see also FIG.6a);

in FIG. 8b, said upward movement is stopped. This stopping is first of all controlled by the processing unit which, as in the previous case, has stored the general configuration of the trestle. The stopping is however also controlled by a sensor which detects the presence and possibly the inclination of the ledger T. The final stopping position is anyhow stored in the processing unit so as to be used again;

in FIG. 8c, the hook finger 23 is caused to move in the direction of the arrow Fb, until the hook end 23' of said finger 23 projects beyond the inner edge T' of the ledger T;

in FIG. 8d, the hand is moved down, according to the arrow Fc, until the finger 23 has come in contact with the upper surface of the ledger T. As known, this ledger T is inclined so that the plane of its projecting flange is not horizontal; the finger 23 is however apt to bear exactly on this plane, thanks first of all to a rotation controlled by the processing unit according to the inclination detected by the sensor, and also thanks to the fact that the body 22 can be left free to rotate (arrow Fd) together with the ring 21, so as to bear on said plane;

in FIG. 8e, the body 22 is moved according to the arrow Fe, so that the counterfinger 24 is led to bear against the lower part of the ledger T;

finally, in FIG. 8f, the finger 23 is again moved backward (in the direction Ff), so that its end 23' may hook onto the edge T' of the ledger T. In practice, the projecting flange of the ledger T is thus strongly tightened between the end 23' of the finger 23 and the counterfinger 24, whereby the hand is positively gripped on the ledger T.

Also in this embodiment, should the pole surface change inclination and show a pendency variation, the gripping hand is controlled so as to move the body 22 along the axis Y—Y (FIG. 8a), thereby drawing the robot close to and/or away from the pole surface, in a fully similar way to what has been previously described with reference to FIG. 5.

The foregoing preferred embodiments are considered illustrative only. Numerous other modifications and changes will readily occur to those persons skilled in the robotic art after reading this disclosure. Consequently, the disclosed invention is not limited to the exact constructions shown and described above but rather is encompassed within the letter and spirit of the following claims.

I claim:

1. A climbing robot, movable along a trestle structure, particularly the trestle structure of a pole for high-voltage overhead electric lines, said pole having a plurality of angle bars forming uprights of changing inclination and also forming ledgers at varying mutual distances, said robot comprising:

a main body;
   a main slide movable along the main body;
   a first gripping hand carried by the main body;
   a second gripping hand carried by the main slide;
   clamping finger means, attached to the first and second gripping hands, for gripping one of the plurality of angle bars forming the uprights and the ledgers; and
   at least one position sensor means, connected to the main body, for acquiring data about the changing inclination of the uprights and also about the varying mutual distances between the ledgers;
   whereby the robot climbs up and down over obstacles formed by the changing inclination of the uprights and by the varying mutual distances between the ledgers.

2. The robot, according to claim 1, further comprising:

a dihedral bearing seat means, operatively connected with the clamping finger means, for engaging a corner of one of the plurality of angle bars.

3. The robot, according to claim 2, further comprising:

a control piston means, arranged between the clamping finger means, for moving the dihedral bearing seat means into and out of engagement with the corner of one of the plurality of angle bars.

4. The robot, according to claim 3, further comprising:

arm means, carried by the main slide, for drawing the second gripping hand close to and away from the main body.

5. The robot, according to claim 4, further comprising:

a support core means, rotatably mounted in the main slide, for allowing the arm means to slide towards and away from the corner of one of the plurality of angle bars.

6. The robot, according to claim 5, wherein:

said support core means also rotates the arm means.

7. The robot, according to claim 1, further comprising:

a main guide means, formed in the main body, for allowing movement of the main slide therealong.

8. The robot, according to claim 7, further comprising:

a secondary slide arranged adjacent to the main slide in the main body.

9. The robot, according to claim 8, further comprising:

a secondary guide means, also formed in the main body, for allowing movement of the secondary slide therealong.

10. The robot, according to claim 9, wherein:

said first gripping hand carried by the main body is mounted on the secondary slide.

11. The robot, according to claim 1, wherein:

each of said clamping finger means has a hooked end.

12. The robot, according to claim 11, wherein:

each of said clamping finger means also has a fixed couterfinger corresponding to each hooked end.

13. The robot, according to claim 12, wherein:
each of said clamping finger means further has a rotatable support ring.

14. The robot, according to claim 12, wherein:
said hooked end of each of the clamping finger means is extendible beyond the corresponding fixed counterfinger so as to engage one of the ledgers.

* * * * *